Nov. 23, 1965  A. L. HUBBARD  3,218,788
COTTON HARVESTER

Filed Nov. 16, 1962  3 Sheets-Sheet 1

INVENTOR.
A. L. HUBBARD
BY William A. Murray
ATTORNEY

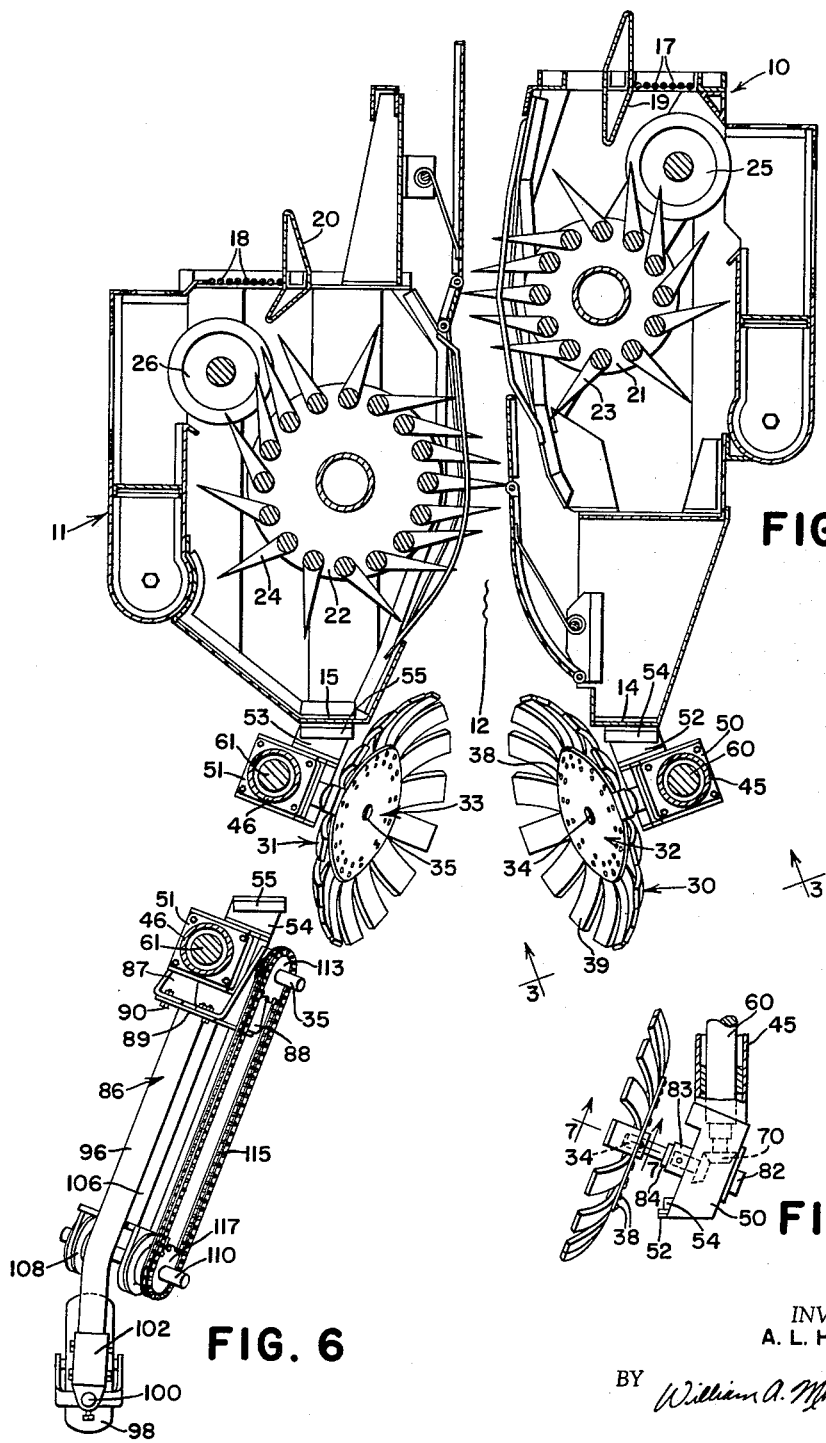

Nov. 23, 1965     A. L. HUBBARD     3,218,788
COTTON HARVESTER
Filed Nov. 16, 1962     3 Sheets-Sheet 3
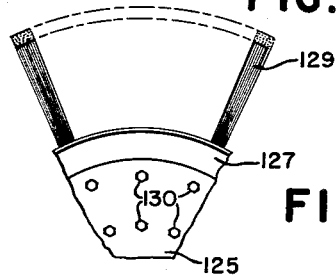
FIG. 10
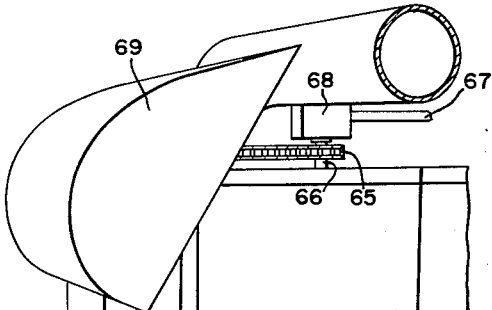
FIG. 5
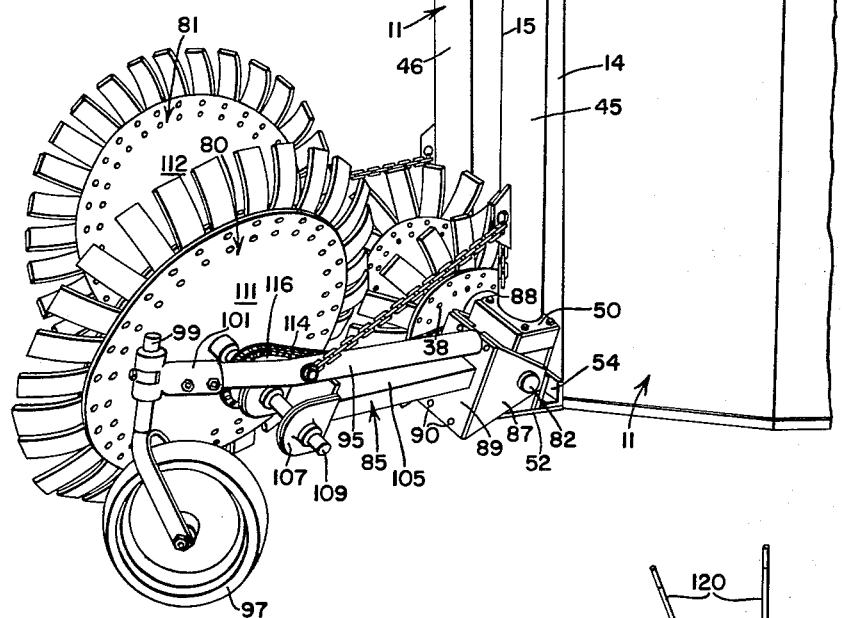
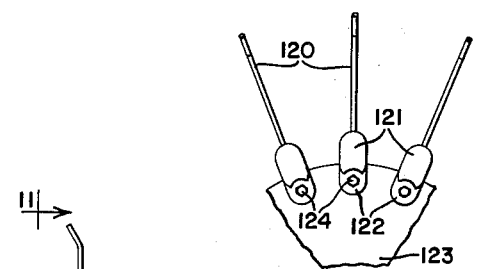
FIG. 11
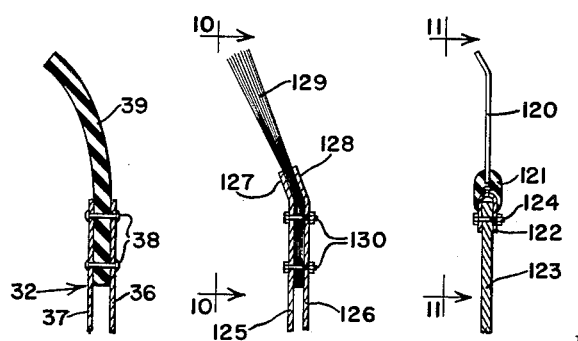
FIG. 7    FIG. 8    FIG. 9
INVENTOR.
A. L. HUBBARD
BY William A. Murray
ATTORNEY

United States Patent Office 3,218,788
Patented Nov. 23, 1965

3,218,788
COTTON HARVESTER
Arthur L. Hubbard, Des Moines, Iowa, assignor to Deere & Company, Moline, Ill., a corporation of Delaware
Filed Nov. 16, 1962, Ser. No. 238,139
7 Claims. (Cl. 56—28)

This invention relates to a cotton harvester and more particularly to a salvaging device used in combination with a cotton harvester.

The object of the present invention is to provide a cotton harvester having a housing structure with a pair of upright casings spaced apart to define a fore-and-aft extending passage. Each of the casings have supported therein a cleaning structure and cooperating with the cleaning structure are rotary means which moves the cotton bolls adjacent thereto so that the trash and foreign matter will be separated from the cotton. Part of the rotary means includes an upright picking drum with laterally extending spindles that protrude into the plant passage and snag cotton bolls on the plant. The bolls are then passed into the casing. Positioned forwardly of both casings are a pair of opposed and upright rotary rakes with radially extending flexible fingers which sweep the surface of the ground and pick up fallen bolls, or bolls retained on the lower portion of the plants, and drive them rearwardly into the plant passage and into contact with the spindles. The cotton, picked up on or closely adjacent the ground is relatively dirty and consequently the cleaning structures within the casings will operate to clean the cotton bolls.

The broad idea of using rotary rakes with a cotton harvester is not new. For example Court 1,967,924 teaches the principle of using a rotary rake in combination with a different type of cotton harvester. Therefore, it is the primary object of the present invention to provide an entirely new combination of cotton harvesting structure which harvests both the bolls retained on the plant as well as the cotton bolls which might have fallen onto the ground. In some instances the present device may be used in a field already picked and the salvaging portion of the harvester may be utilized to pick fallen cotton bolls. It is still a further object of the present invention to provide a salvaging mechanism which includes an upright column or member for each side of the plant passage which supports a forwardly projecting salvaging device on the side of the passage.

Other objects and advantages of the present invention will become apparent to those skilled in the art as the nature of the invention is better understood from the following description and as shown in the accompanying drawings.

FIG. 2 is a plan view of the harvester shown in FIG. 1 with the various housings removed to show internal mechanism.

FIG. 3 is a view taken substantially along the line 3—3 of FIG. 2.

FIG. 5 is a side perspective view of the embodiment shown in FIG. 4.

FIG. 6 is a plan view of the supporting structure and drive for a salvaging mechanism or device on the right side of the plant passage.

FIG. 7 is an enlarged sectional view taken substantially along the line 7—7 of FIG. 3.

FIG. 8 is a view similar to FIG. 7 showing a modification of the mechanism.

FIG. 9 is a view somewhat similar to FIG. 7 but showing still a further modification of the mechanism.

FIG. 10 is a partial view of the rotary pickup device as viewed along the line 10—10 of FIG. 8.

FIG. 11 is a partial view of the pickup device as shown along the line 11—11 of FIG. 9.

Figure 1:
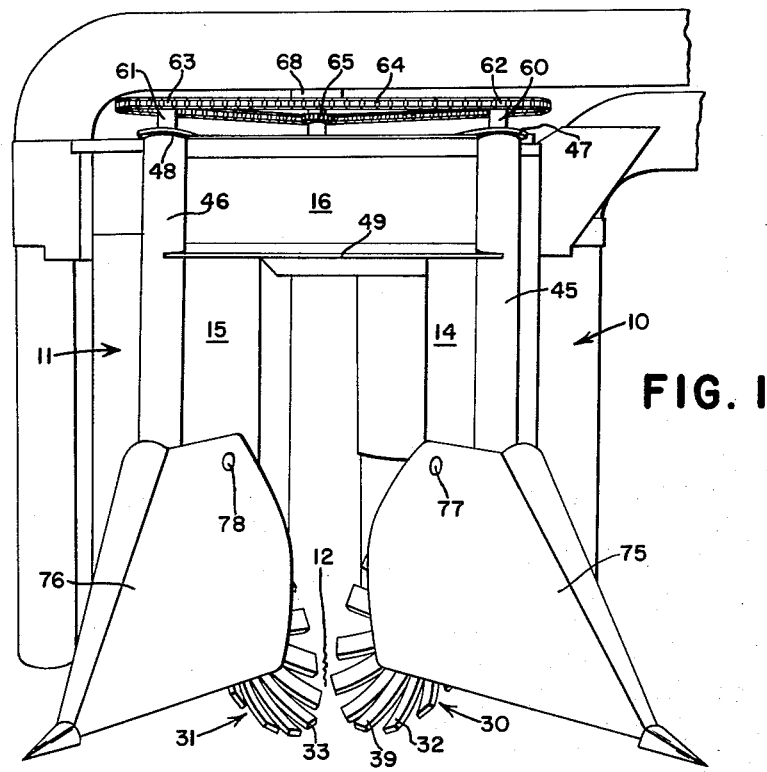
FIG. 1 is a front view of a part of the cotton harvester.

The cotton harvester is similar in many respects to a type well known in the art. The harvester includes housing structure composed of left- and right-hand casings 10, 11 respectively spaced apart to define a fore-and-aft extending plant passage 12. The casings 10, 11 have a front inverted U-shaped panel with upright wall sections 14, 15 on opposite sides of the passage 12 and an overhead upright wall section bridging across the passage 12. The inner edges of the upright panel sections 14, 15 and the lower edge of the panel section 16 defines a forwardly opening material inlet for receiving the plants as the harvester advances over the field. The casings 10, 11 includes on their rear sides grill works in the form of upright spaced apart bars 17, 18 respectively and upright baffle structures 19, 20. Contained within the casings 10, 11 are upright spindle drums 21, 22 having laterally extending spindles 23, 24 that extend into the plant passage 12 and operate to snag the ripened cotton bolls on the plant and to pass them inwardly of the respective casings 10, 11, the spindles having suitable barbs, not shown, for the purposes of snagging the cotton bolls. Upright doffing drums 25, 26 are positioned rearwardly and outwardly as respects the spindle drums 21, 22 and operate to dislodge the cotton bolls from the spindles. The spindle drums 21, 22 and their respective doffing mechanism 25, 26, are conventional and have been shown and described in previous patents. For example complete details of the spindle drum are shown in U.S. Patent 2,723,520. Details of the doffer are shown in U.S. Patent 3,048,962. Therefore, if more details of the spindle and doffing mechanism are desired, such may be had by reference to these patents.

The rear walls of the casings 10, 11 also open rearwardly adjacent to and inboard of the respective baffle structures 19, 20. These open portions of the casings, the baffles 19, 20, and the grill works 17, 18 operate as cleaning mechanisms for the harvester. In operation the spindles 23, 24 will pick the ripe cotton bolls and some trash. Upon entry into the housing, the trash will be thrown in many instances through the openings in the rear wall or against the baffle structures 19, 20 and be guided through the openings. Other trash remaining with the cotton bolls will be moved by the respective doffing mechanisms 25, 26 against the grills 17, 18 so that trash will pass between the bars, and the cotton bolls will be retained in the respective casings 10, 11. In many respects the cotton harvesting mechanism, housing, and cleaning system are similar to that shown in U.S. Patent 2,904,948 and reference should be made to that patent for further details.

Referring now to the forms of the invention shown in FIGS. 1, 2 and 3, there is provided a pair of rotary pickup devices, indicated in their entirety by the reference numerals 30, 31 respectively, flaring forwardly and outwardly from the passage 12. The pickup devices 30, 31 are composed basically of pickup wheels 32, 33 supported in inclined drive shafts 34, 35. Referring to FIG. 7 for the general construction on the wheel 32, it is composed of a pair of circular plates 36, 37 spaced apart so that a series of flexible or yieldable fingers 39 may be compressed between them. The plates 36, 37 are riveted together, as at 38. The rivets extend through the flexible fingers 39 and generally hold the fingers between the plates 36, 37. The fingers 39 are flared to one side of the plates 35, 36 and toward the passage 12 so as to aid in the effective pickup ability of the fingers. From a practical standpoint, it has been found that the natural curvature of a tire carcass cut in strips operate very well as the fingers 39.

Positioned forwardly of the front wall panel 14, 15 and on opposite sides of the passage 12 are a pair of hollow columns 45, 46 respectively. The columns 45, 46 are fixed to the casings 10, 11 by means of upper plates 47, 48 that are rigid with the housing and project forwardly from the upper surface of the housing, and a midplate 49 that extends across the front of the housing adjacent the lower edge of the front overhead panel 16. Suitable welding, not shown, rigidifies the columns 45, 46 to the plates 47–49. Carried on the lower end of the columns 45, 46 are gear housings 50, 51. The housings 50, 51 are in turn fixed to under plates 52, 53 extending rearwardly and fixed to the lower front edge of the panels 14, 15. Angle irons 54, 55 have vertical flanges fixed to the front surfaces of the respective panels 14, 15 and lateral flanges fixed to the upper surfaces of the plates 52, 53. Consequently the posts 45, 46 are also fixed at their lower ends to the housing structure.

Contained within the hollow columns 45, 46 are a pair of vertical drive shafts 60, 61 driven at their upper ends by sprockets 62, 63 respectively and a chain 64. The chain 64 is driven by a drive sprocket 65 carried on a shaft 66. The shaft 66 is driven from a main power source, not shown, of the cotton harvested as indicated by a fore-and-aft extending main drive shaft 67 (FIG. 5) and a bevel gear transmission 68. A shield 69, as shown in FIG. 5 covers the forward portion of the drive.

The lower ends of the vertical drive shafts 60, 61 extend into the respective gear housings 50, 51 and are drivingly connected to the wheel drive shafts 34, 35 by means of bevel gears, as indicated at 70 in dotted representation in FIG. 3.

The drive shafts 34, 35 are angled forwardly from the respective housings 50, 51 and also are inclined upwardly. Consequently the pickup wheels 32, 33 are flared outwardly from the passage 12 and also are inclined so that the rear lower fingers are relatively close together. The wheels 32, 33 rotate so that their underside moves rearwardly and upwardly. They are also either in direct contact with the ground or closely adjacent the ground and the fingers 39 will contact the extreme lower cotton bolls on the plants and also those bolls having fallen from the plant and will throw them into the passage 12 to be contacted by the spindles 23, 24 and passed into the respective casings 10, 11. Of particular importance is the fact that there is cleaning mechanism available in the casings 10, 11 so that the cotton is cleaned prior to being moved into a receptacle. The present invention may be used in combination with the first picking of the cotton, i.e. in which the spindles 23, 24 harvest the cotton from the cotton plants, or the present invention may be used as a second run over the field with the primary purpose being to harvest the fallen bolls. When used in the first picking, the fact that there is cleaning mechanism within the casings 10, 11 becomes particularly important since the quality of the picked cotton plants as well as the quality of the fallen cotton must be substantially the same since they will be commingled.

Particularly when the pickup devices are used during the first picking, it is desirable that gathering shielding is used to gather the plants into the plant passage 12 and also to raise the lower portion of the plants. Consequently there is provided (FIG. 1) a pair of vertically disposed gathering shields 75, 76 which generally overlie the respective pickup devices 30, 31. The shielding 75, 76 have their inner upright sides inwardly, as respects the plant passage 12, of the pickup wheels 32, 33. However, the lower edges and rear edges of the respective shields 75, 76 are forwardly and above respectively the rearwardly projecting and downwardly projecting fingers of the pickup wheels 30, 31. With such an arrangement of shielding, the shields may operate in conventional manner in raising the cotton plants as well as gathering them into the passage 12. Also, the pickup wheels 30, 31 may operate to pick up the fallen cotton bolls from the ground. The shields 75, 76 are pivotally mounted at 77, 78 to rise and fall to accommodate the contour of the ground.

Figure 4:
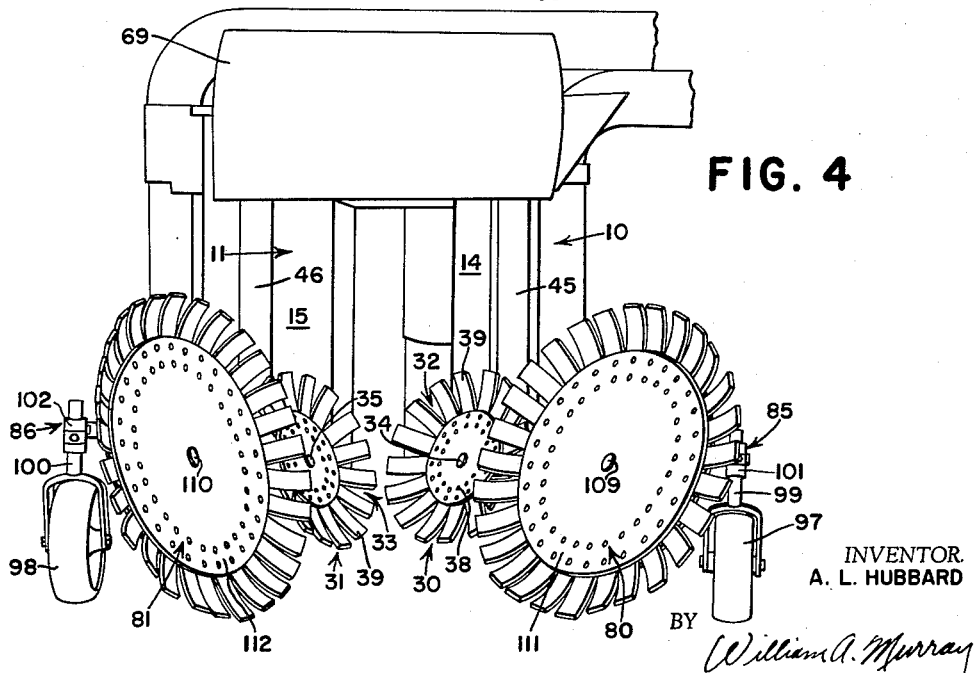
FIG. 4 is a front view similar to FIG. 1 but showing a modification of the boll pickup or salvaging means.

Referring now to the form of the invention shown in FIGS. 4–6, additional or second pickup devices 80, 81 positioned forwardly and outwardly of the first or rear pickup devices 30, 31 are provided. Each of the gear housings 50, 51 is provided with a pair of round protuberances or bosses such as is shown at 82, 83 in FIG. 3, the boss portions 82, 83 being formed about the axis of the shaft 34. The inner end of the boss 83 is reduced at 84 to form a shoulder with the boss portion 83. A pair of yoke or arm structures 85, 86, extend forwardly and outwardly from the respective gear casing 50, 51. The yoke or arm structure 85 is composed of a yoke end including a pair of side plates 87, 88 lying adjacent opposite sides of the gear housing 50 and having openings to receive the boss 82 and the reduced end 84 of the boss 83 respectively. The side plate 88 bears against the shoulder formed between the boss 83 and the reduced end 84. The side plates 87, 88 are joined forwardly of the gear casing 50 by an upright plate 89 bolted at 90 to the side plates. By removing the bolts 90, the entire yoke structure may be removed from the casing 50. A similar mounting arrangement, as shown in FIG. 6, mounts the yoke structure 86 on the gear casing 51.

The yoke structures 85, 86 include a pair of forwardly and outwardly directed arms 95, 96 that carry at their forward ends gage wheels 97, 98 respectively. The gage wheels may be adjusted vertically relative to the arms 95, 96 by positioning and locking the vertical support rods 99, 100 for the respective wheels in the end fittings 101, 102 on the forward ends of the arms 95, 96.

Also projecting forwardly and outwardly from the plates 89 are beams or arms 105, 106 carrying at their forward ends bifurcated journal supports 107, 108 for the second pickup wheel drive shafts 109, 110 respectively. Supported on the shafts 109, 110 are large pickup wheels 111, 112 positioned both forwardly and outwardly as respects the rear or first wheels 32, 33. The drive shafts 109, 110 are driven by sprockets on the shafts 34, 35, one of which is shown at 113 in FIG. 6, chains 114, 115, and sprockets 116, 117 suitably keyed to the respective shafts 109, 110. Since the entire yoke structures 85, 86 are pivoted about the axes of the shafts 34, 35 vertical movement of the yoke structures will have no bearing or effect upon the drive chains 114, 115.

In operation the larger and offset front or second wheels 111, 112 will sweep further to the side of the plants and will move the fallen cotton bolls either directly into the plant passage 12 or into a position where the first or rear wheels 30, 31 will receive them. The larger wheels 111, 112, while not described in detail are similar in construction, except for the comparatively large size, to that of the first rear wheels 30, 31.

Referring now to FIGS. 8, 9, 10 and 11, there are shown modified designs of the fingers. In FIGS. 8 and 10 there is provided a brush type of pickup wheel composed of a pair of plates 125, 126 bolted together at 130 and flared to one side at their outer edges as shown at 127, 128. Positioned between the plates 127, 128 is a continuous series of closely spaced brush elements 129. The elements 129 are bent and directed to one side by the flared ends 127, 128.

In FIGS. 9 and 11, the fingers are composed of rod elements 120 embedded at their inner ends in a rubber support 121 so as to yield. The rubber support 121 adheres to a U-shaped bracket 122 which fits around the outer edge of an annular plate 123 and may be bolted, as at 124, thereto.

The various forms of yieldable fingers such as is shown in FIGS. 7–11 may be used to their best advantage in different parts of the country dependent upon different characteristics of the cotton plant and to various conditions of the soil.

While a limited number of variations and modifications of the present invention have been shown, it should be understood that there is no intention that all forms of the invention were to be included since other forms and variations of the invention will be clearly apparent to those skilled in the art. Therefore, while the present forms are shown for the purpose of clearly and concisely illustrating the principles of the invention, it is not the intention to limit or narrow the invention beyond the broad concepts set forth in the appended claims.

What is claimed is:

1. A cotton harvester comprising: a housing structure composed of a pair of upright casings spaced apart to define a fore-and-aft extending passage; an upright cleaning structure in a side of each casing away from the passage; internal operating mechanism within each casing including upright rotary means with vertically spaced and laterally extending spindles adapted to extend into the passage for snagging cotton bolls and passing the cotton bolls adjacent the cleaning structure; a pair of substantially upright outwardly flaring rotary pickup devices opposite one another across a forward extension of the passage and disposed adjacent the ground, the devices having radial yieldable fingers inclined inwardly in respect to the passage; means on the housing structure supporting the rotary pickup devices for rotation about inwardly, upwardly and forwardly extending axes; means effecting rotation of the devices to effect movement of ground laden cotton bolls and bolls closely adjacent the ground into the passage and into contact with the spindle elements; and a pair of vertically disposed outwardly flaring gathering shields extending forwardly of the respective casings adjacent to and inboard, in respect to the passage, of the respective pickup devices, each of the shields having rear vertically disposed and lower laterally disposed edges positioned forwardly of and above respectively the rearwardly projecting and downwardly projecting fingers of the respective pickup devices.

2. A cotton harvester comprising: a housing structure composed of a pair of upright casings spaced apart to define a fore-and-aft extending passage; internal harvesting mechanism within each casing including means in the passage for collecting cotton bolls and passing the cotton bolls into the casings; a pair of substantially upright outwardly flaring rotary pickup devices opposite one another across a forward extension of the passage and disposed adjacent the ground, the devices having radially and inwardly extending fingers and being inclined in respect to the vertical and fore-and-aft directions whereby the rear lower fingers of the opposite rotary devices are closely adjacent at the mouth of the passage; means on the housing structure supporting the rotary pickup devices; means effecting rotation of the devices to effect movement of ground laden cotton bolls and bolls closely adjacent the ground into the passage and into contact with the means collecting the cotton bolls; and a pair of vertically disposed outwardly flaring gathering shields extending forwardly of the respective casings adjacent to and inboard, in respect to the passage, of the respective pickup devices, each of the shields having rear vertically disposed and lower laterally disposed edges positioned forwardly of and above respectively the rearwardly projecting and downwardly projecting fingers of the respective pickup devices.

3. A cotton harvester comprising: a housing structure composed of a pair of upright casings spaced apart to define a fore-and-aft extending passage; internal operating mechanism within each casing including upright rotary means with vertically spaced and laterally extending spindles adapted to extend into the passage for snagging cotton bolls and passing the cotton bolls adjacent the cleaning structure; upright outwardly flaring rotary pickup devices facing one another across a forward extension of the passage and disposed adjacent the ground, each of the devices having a first wheel adjacent the housing structure and closely adjacent the passage and a second wheel forwardly of and outwardly of the first wheel, said wheels having vertically disposed radial fingers; means connecting the respective pickup devices including drive mechanisms rigid with the casings with first wheel drive shafts having the first wheels mounted thereon and further including forwardly and outwardly projecting rigid arms supported on the drive mechanisms to swing vertically about the axes of the respective drive shafts; second wheel drive shafts supported on the arms carrying the second wheels thereon and drivingly connected to the first wheel drive shafts; and gauge wheels on the arms supporting the forward ends of the arms.

4. A cotton harvester comprising: a housing structure composed of a pair of upright casings spaced apart to define a fore-and-aft extending passage; internal operating mechanism within each casing including upright rotary means with vertically spaced and laterally extending spindles adapted to extend into the passage for snagging cotton bolls and passing the cotton bolls adjacent the cleaning structure; upright outwardly flaring rotary pickup devices facing one another across a forward extension of the passage and disposed adjacent the ground, each of the devices having a first wheel adjacent the housing structure and closely adjacent the passage and a second wheel forwardly of and outwardly of the first wheel, said wheels having vertically disposed radial fingers; means connecting the respective pickup devices including drive mechanisms rigid with the casings with first wheel drive shafts having the first wheels mounted thereon and further including forwardly and outwardly projecting supporting structure supported on the drive mechanisms to swing vertically about the axes of the respective drive shafts, and second wheel drive shafts supported on the structure carrying the second wheels thereon.

5. A cotton harvester comprising: a housing having forward upright wall structure with a forwardly opening material receiving inlet therein; cotton cleaning structure in the housing; a pair of substantially upright outwardly flaring rotary pickup devices forward of the wall structure facing one another on opposite sides of and adjacent the inlet, the devices having vertical yieldable fingers; means on the housing supporting the rotary pickup devices for rotation about forwardly, upwardly and inwardly extending axes whereby the rear lower fingers of the pickup devices are close together; means supporting the rotary pickup devices including a pair of hollow upright beams fixed to the housing closely adjacent the front wall structure and on opposite sides of the inlet with lower ends thereof adjacent the ground, and supporting at their lower ends the rotary pickup devices and upright drive shafts in the beams; corner-turning power transmissions supported on the lower ends of the beams and connected to the respective vertical drive shafts; and means between the corner-turning transmissions and pickup devices effecting rotation of the devices to effect movement of ground borne cotton bolls and bolls closely adjacent the ground through the inlet.

6. A cotton harvester comprising: a housing having forward upright wall structure with a forwardly opening material receiving inlet therein; cotton cleaning structure in the housing; a pair of substantially upright outwardly flaring rotary pickup devices forward of the wall structure facing one another on opposite sides of and adjacent the inlet, the devices having vertical yieldable fingers; means on the housing supporting the rotary pickup devices for rotation about forwardly, upwardly and inwardly extending axes whereby the rear lower fingers of the pickup devices are close together; means supporting the rotary pickup devices including a pair of upright structural members lying adjacent the front wall structure on opposite sides of the inlet and extending substantially the height of the wall structure with means fixing them to the wall structure adjacent their upper and lower ends; and means effecting rotation of the devices to effect movement of ground borne cotton bolls and bolls closely adjacent the ground through the inlet.

7. A cotton harvester comprising: a housing having forward upright wall structure with a forwardly opening material receiving inlet therein; cotton cleaning structure in the housing; a pair of substantially upright outwardly flaring rotary pickup devices forward of the wall structure facing one another on opposite sides of and adjacent the inlet, the devices having vertical yieldable fingers; means on the housing supporting the rotary pickup devices for rotation about forwardly, upwardly and inwardly extending axes whereby the rear lower fingers of the pickup devices are close together; means supporting the rotary pickup devices including a pair of upright structural members lying adjacent the front wall structure on opposite sides of the inlet and extending substantially the height of the wall structure with means fixing them to the wall structure adjacent their upper and lower ends; structures at the lower ends of the structural members defining pivots on opposite sides of the inlet with axes extending inwardly, upwardly and forwardly from points adjacent the lower ends of the members, means supporting the rotary pickup devices on the structures for movement on the respective pivots; and means effecting rotation of the devices to effect movement of ground borne cotton bolls and bolls closely adjacent the ground through the inlet.

References Cited by the Examiner
UNITED STATES PATENTS

| | | | |
|---|---|---|---|
| 1,105,235 | 7/1914 | Appleby | 56—29 |
| 1,967,924 | 7/1934 | Court | 56—14 |
| 2,766,576 | 10/1956 | van der Lely | 56—345 |
| 2,845,769 | 8/1958 | Hintz et al. | 56—344 |
| 2,957,299 | 10/1960 | Gustafson et al. | 56—400 |
| 3,038,292 | 6/1962 | van der Lely et al. | 56—400 X |
| 3,046,721 | 7/1962 | Kowalik et al. | 56—41 |
| 3,135,082 | 6/1964 | Czajkowski | 56—28 |
| 3,135,083 | 6/1964 | Czajkowski | 56—28 |
| 3,151,431 | 10/1964 | Daugherty | 56—28 |

ABRAHAM G. STONE, *Primary Examiner.*

RUSSELL R. KINSEY, T. GRAHAM CRAVER, ANTONIO F. GUIDA, *Examiners.*